(12) United States Patent
Kermel et al.

(10) Patent No.: US 11,695,471 B2
(45) Date of Patent: Jul. 4, 2023

(54) DEVICE AND SYSTEM FOR THE RECEPTION OF ADS-B MESSAGES BY AN ORBITING SATELLITE

(71) Applicant: AIRBUS DEFENCE AND SPACE SAS, Toulouse (FR)

(72) Inventors: Frédéric Kermel, Toulouse (FR); Sergi Luque Ribas, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 17/909,337

(22) PCT Filed: Mar. 5, 2021

(86) PCT No.: PCT/FR2021/050376
§ 371 (c)(1),
(2) Date: Sep. 2, 2022

(87) PCT Pub. No.: WO2021/176186
PCT Pub. Date: Sep. 10, 2021

(65) Prior Publication Data
US 2023/0085747 A1    Mar. 23, 2023

(30) Foreign Application Priority Data
Mar. 5, 2020  (FR) .................................. 20 02229

(51) Int. Cl.
| H04B 7/204 | (2006.01) |
| H04B 7/195 | (2006.01) |
| H04B 7/185 | (2006.01) |

(52) U.S. Cl.
CPC ....... *H04B 7/2041* (2013.01); *H04B 7/18508* (2013.01); *H04B 7/195* (2013.01)

(58) Field of Classification Search
None
See application file for complete search history.

(56) References Cited

U.S. PATENT DOCUMENTS 10,116,374 B2 * 10/2018 Dyson ................... H04L 7/0087
2014/0153632 A1 * 6/2014 Malaga ................. G01S 13/782
375/239

(Continued)

FOREIGN PATENT DOCUMENTS

| CN | 108418610 | 8/2018 |
| EP | 2 590 341 | 5/2013 |

OTHER PUBLICATIONS

French International Search Report with English Translation for PCT/FR2021/050376, dated Jun. 21, 2021, 6 pages.

(Continued)

*Primary Examiner* — Shripal K Khajuria
(74) *Attorney, Agent, or Firm* — Nixon & Vanderhye P.C.

(57) ABSTRACT

A device for the reception of ADS-B messages for a satellite is disclosed including an array of sources and a beamforming module, a ground footprint of a field of view defining a service area, different service areas being associated with different positions of the satellite, a ground footprint of a beam defining a spot in the service area, the beamforming module being configured to form each beam by applying combination coefficients, the reception device having a processing circuit configured to obtain information representative of a position of the satellite and to modify a set of combination coefficients so as to adapt the surface area and/or or the shape of the formed spots to a geographical distribution of the aircrafts within the service area associated with the position of the satellite.

29 Claims, 4 Drawing Sheets

(56) References Cited

U.S. PATENT DOCUMENTS

2016/0011318 A1* 1/2016 Cohen .................... G01S 19/42
 342/357.68
2016/0087714 A1 3/2016 Sayegh
2018/0269958 A1 9/2018 Garcia et al.

OTHER PUBLICATIONS

French Written Opinion of the ISA, for PCT/FR2021/050376, dated Jun. 21, 2021, 7 pages.
Yu et al., "Integrated antenna and receiver system with self-calibrating digital beamforming for space-based ADS-B", Acta Astronautica, vol. 170, Feb. 5, 2020, pp. 480-486.

* cited by examiner

DEVICE AND SYSTEM FOR THE RECEPTION OF ADS-B MESSAGES BY AN ORBITING SATELLITE

CROSS REFERENCE TO RELATED APPLICATIONS

The present application is a National Phase of International Application Number PCT/FR2021/050376 filed Mar. 5, 2021, which designated the U.S. and claims priority benefits from French Application Number FR 2002229 filed Mar. 5, 2020, the entire contents of each of which are hereby incorporated by reference.

TECHNICAL FIELD

This invention belongs to the field of satellite telecommunications, and relates more particularly to the reception of ADS-B ("Automatic Dependent Surveillance-Broadcast") messages from a satellite in non-geostationary orbit around the Earth.

PRIOR ART

These days most aircraft, and more particularly airplanes, spontaneously transmit ADS-B messages.

There are several physical layer protocols that exist for ADS-B messages. The most common is known as "1090 MHz Extended Squitter" or 1090 ES and is an extension of the Mode S radar transponders using frequencies around 1090 megahertz (MHz). Other physical layer protocols are also known; we can cite in particular the UAT ("Universal Access Transponder") protocol which uses frequencies around 978 MHz or the VDL ("VHF Data Link") Mode 4 protocol which uses frequencies around 108-118 MHz.

ADS-B messages are transmitted in particular in order to avoid collisions between airplanes. Indeed, an airplane equipped with an ADS-B transponder regularly transmits ADS-B messages which include in particular the position of the airplane (generally in the form of GPS coordinates ("Global Positioning System")), the direction of the airplane, the speed of the airplane, etc. These ADS-B messages can be received by any airplane within range of the transmitting airplane, and the receiving airplane can then compare its own position, direction, speed, etc., to those indicated in the ADS-B messages received, and detect any risk of collision and, if necessary, so inform the piloting team.

Such ADS-B messages can also be received by ADS-B ground stations, thus allowing air traffic control authorities to know the positions, directions, speeds, etc., of airplanes within range of the ADS-B ground stations, and to use this information to significantly improve their knowledge and control of air traffic.

However, there are many geographical regions where it is not possible to install ADS-B ground stations. This is the case for example for oceans, mountains, deserts, etc. Therefore there can only be partial geographical coverage of the Earth's surface, for the collection of ADS-B messages by means of ADS-B ground stations.

In order to increase geographical coverage for the collection of ADS-B messages, it has been proposed to place ADS-B reception devices onboard satellites, in order to supplement the geographical coverage provided by ADS-B ground stations or even to replace said ADS-B ground stations. Thus, the ADS-B messages transmitted by airplanes can be received by a satellite, which sends on to a ground station the information included in the received ADS-B messages. Typically, the information included in ADS-B messages is transmitted to ground stations using a different physical layer protocol than the ADS-B protocol, for example using a frequency band reserved for satellite communications.

However, ADS-B protocols were not designed for the reception of ADS-B messages from satellites. Consequently, the reception of ADS-B messages from satellites, including those in low orbit ("Low Earth Orbit" or LEO in the literature) poses certain difficulties.

In particular, due to its positioning at a high altitude and its field of view directed towards the Earth, a satellite is able to receive ADS-B messages transmitted from much larger geographical regions than the maximum range of the ADS-B protocol in the case of terrestrial communication between two airplanes or between an airplane and an ADS-B ground station. Thus, a satellite is able to receive ADS-B messages from a much larger number of aircrafts than in the case of terrestrial communication. As a result, the probability of collision between ADS-B messages at a satellite is significantly greater than in the case of terrestrial communication, and it is very difficult to detect ADS-B messages when there is a significant number of collisions between ADS-B messages.

In order to reduce the probability of collision, it is known to carry an antenna onboard, suitable for forming a plurality of beams, each beam being narrower than the field of view of the satellite. The ground footprint of a beam, called a "spot", is thus reduced in comparison to the service area defined by the ground footprint of the field of view of the satellite, consequently reducing the number of ADS-B messages likely to be received in a beam, and therefore also reducing the probability of collision in a beam.

However, in order to be able to collect the ADS-B messages transmitted from the entire service area, it is necessary to be able to process simultaneously the signals received in the various beams, which means that a greater number of processing modules must be carried onboard the satellite, up to as many processing modules as there are beams formed (independently of redundancy issues where additional processing modules could be placed onboard to compensate for failure of a processing module).

Thus, the greater the number of beams, the smaller the potential number of spots formed, which makes it possible to reduce the probability of collision in each beam. However, the greater the number of beams, the greater the number of processing modules that must be carried onboard the satellite, which adversely increases the volume and mass of the satellite, as well as its electricity consumption.

SUMMARY

This invention aims to remedy some or all of the limitations of solutions of the prior art, in particular those set forth above, by proposing a solution which makes it possible to collect ADS-B messages from a satellite while reducing the probability of collision between ADS-B messages and reducing the number of processing modules to be carried onboard the satellite.

To this end, and according to a first aspect, a device for the reception of ADS-B messages is proposed for a satellite in non-geostationary orbit around the Earth, the reception device comprising an array of sources and a beamforming module capable of forming beams within a field of view of said array of sources, a ground footprint of said field of view defining a service area of said reception device, different service areas being associated with different respective positions of the satellite in non-geostationary orbit, a ground footprint of a beam defining a spot within the service area, said beamforming module being configured to form each beam by combining signals provided by the array of sources by applying combination coefficients. Furthermore, said reception device comprises a processing circuit configured to obtain information representative of a position of the satellite on the non-geostationary orbit and to modify a set of combination coefficients of the beamforming module so as to adapt the surface area and/or the shape of the spots of the formed beams to a geographical distribution of aircrafts within the service area associated with the position of said satellite on the non-geostationary orbit.

Thus, as the satellite moves in its non-geostationary orbit, the surface area and/or the shape of the spots of the formed beams are adapted dynamically to the geographical distribution, known beforehand, of aircrafts within the service area associated with the current position of said satellite in its non-geostationary orbit.

Indeed, it is possible to establish beforehand an aircraft density map at the scale of the Earth or part of the Earth, on the basis of prior knowledge of air traffic. Such an aircraft density map represents, for example, the average density or the maximum density of aircrafts flying over each part of the Earth's surface. In practice, the probability of collision increases with the number of aircrafts present within a beam spot. To limit the probability of collision, it is therefore advantageous, for defining the beam spots to be formed, to take into account prior knowledge of the theoretical geographical distribution of aircrafts within the service area considered.

For example, to limit the probability of collision in the beams, it is possible to form beam spots of different surface areas depending on the density of aircrafts in the respective portions of the service area in which the spots are to be formed. For example, it is possible to form spots of small surface area in portions with a high density of aircraft, and in contrast to form spots of large surface area in portions with a low density of aircraft. In certain examples, it is also possible to determine the surface area and/or the shape of each spot so as to ensure that the number of aircrafts likely to be present in each spot, based on the geographical distribution of aircrafts within the service area, remains below a predetermined threshold value. Said threshold value is for example about 200 aircraft, or even about 100 aircraft.

It is therefore understood that by taking into account the theoretical geographical distribution of aircrafts within the service area considered, this makes it possible to adapt the formed beams to the air traffic anticipated within this service area. This adaptation makes it possible in particular to optimize the number of formed beams, their surface area and/or their shape for example being determined such that there is substantially the same probability of collision in each formed beam. Such an optimization of the number of formed beams therefore makes it possible to reduce the requirements in terms of processing modules to be carried onboard the satellite, since the maximum number of beams that must be formed simultaneously dictates the minimum number of processing modules to be carried onboard the satellite.

Indeed, in the solutions of the prior art, the formed beams were static (not dynamically modifiable). Their shapes and surface areas were determined once and for all and engineered for the worst case. The beams thus formed were necessarily all sized to restrict the maximum number of aircrafts that could be found within the corresponding spots, which in particular required having a small surface area for all the beam spots, and ultimately a large number of beams to be formed. In the invention, beam spots of small surface area are formed only in those portions of the service area where this is necessary. Elsewhere, it is possible to increase the surface area of the beam spots, which allows reducing the total number of beams that need to be formed in order to cover the entire service area.

It should be noted that the beams to be formed within a given service area are not necessarily all formed simultaneously. It is also possible to form all or part of the beams successively, during a period of observation of the service area, of predetermined duration. The formation of certain beams successively (known as "beam hopping" in the literature) makes it possible to reduce the number of beams to be activated simultaneously, which also makes it possible to reduce the number of processing modules to be carried onboard the satellite.

In some particular embodiments, the reception device may further comprise one or more of the following features, alone or in all technically possible combinations.

In some particular embodiments, the processing circuit is configured to control the respective activation durations of the spots of the beams formed within the service area associated with the position of the satellite, according to the geographical distribution of aircrafts within said service area.

Such arrangements are advantageous in that they allow adapting the respective activation durations of the beam spots, meaning the durations during which said beam spots are actually formed, to the air traffic conditions anticipated in the service area. Such an adaptation can allow reducing the probability of collision and/or resolving certain collisions. In particular, the transmission of ADS-B messages is pseudoperiodic in that the transmission period of ADS-B messages comprises a fixed part and a random part. Due to this random part, two aircrafts which transmit respective ADS-B messages at the same time will transmit their next ADS-B messages at different times. Thus, prolonged reception (activation duration) of a spot makes it possible to resolve certain collisions. In addition, prolonged reception also makes it possible to improve the resolution of collisions when implementing multi-user detection techniques ("Multi-User Detection" or MUD in the literature). More generally, the greater the number of aircrafts present within a beam spot, the more the time required to extract each ADS-B message received in that beam spot is potentially long.

It is thus advantageous, for example, to provide longer activation durations for beam spots likely to include a large number of aircrafts than for beam spots likely to include a smaller number of aircraft. In addition, such optimization of activation durations also makes it possible to optimize the processing over an observation period of predetermined duration. In particular, reduction of the activation duration when such is possible (potentially low number of aircrafts within the beam concerned) makes it possible in certain cases for a same processing module to process sequentially those beams for which the sum of the activation durations remains less than the duration of the observation period. However, the activation duration of a beam must be sufficient to allow each aircraft located within the associated spot to transmit at least one ADS-B message.

In some particular embodiments, the set of coefficients is modified so as to adapt the shape of at least one formed beam spot to a preferred path for aircrafts within the service area associated with the position of the satellite.

Indeed, air traffic is not random, and sometimes there are air corridors which many aircrafts converge towards, for example connecting Europe to North America. Such air corridors correspond to preferred paths which can also be taken into account when defining the beam spots to be formed. For example, the shape of at least one beam spot can be chosen to be oblong along a preferred path for aircrafts or even oblong transversely to said preferred path.

In some particular embodiments, the set of combination coefficients is configured not to form spots within an exclusion region that is predetermined for the service area associated with the position of the satellite. For example, the exclusion region may correspond to a geographical region provided with ADS-B ground stations and/or to a geographical region in which the density of aircrafts is greater than a predetermined threshold value.

In some particular embodiments, the reception device comprises a module for the reception of a mission plan, said mission plan comprising a plurality of sets of combination coefficients for the beamforming module, each set of combination coefficients being associated with a respective position of the satellite on the non-geostationary orbit and making it possible to form beam spots whose surface area and/or shape is adapted to the theoretical geographical distribution of aircrafts within the service area associated with said respective position of the satellite in said non-geostationary orbit.

According to a second aspect, a satellite is proposed comprising a reception device according to any one of the embodiments of the invention.

According to a third aspect, a method is proposed for controlling, via a ground station, a device for the reception of ADS-B messages which is carried onboard a satellite in non-geostationary orbit around the Earth, said reception device comprising an array of sources and a beamforming module capable of forming beams within a field of view of said array of sources, a ground footprint of said field of view defining a service area of said reception device, different service areas being associated with different respective positions of the satellite on the non-geostationary orbit, a ground footprint of a beam defining a spot within the service area, said beamforming module being configured to form each beam by combining signals supplied by the array of sources by applying combination coefficients. The control method comprises, for each among a plurality of predetermined positions of the satellite in said non-geostationary orbit, the steps of:
  obtaining an aircraft density map representative of the geographical distribution of aircrafts within the service area associated with the considered position of the satellite on the non-geostationary orbit,
  determining a set of combination coefficients on the basis of the aircraft density map, the set of combination coefficients being determined so as to adapt the surface area and/or the shape of the formed beam spots to the geographical distribution of aircrafts within the service area associated with the position considered.

The control method further comprises a step of transmitting, to the reception device onboard the satellite, a mission plan which groups together the sets of combination coefficients respectively associated with the plurality of positions of the satellite on the non-geostationary orbit.

In some particular modes of implementation, the control method may further comprise one or more of the following features, alone or in all technically possible combinations.

In some particular modes of implementation, each set of combination coefficients makes it possible to form a plurality of beams simultaneously and/or successively during an observation period of predetermined duration for observing the service area associated with the position associated with said set of combination coefficients.

In some particular modes of implementation, the control method comprises, for each position among the plurality of positions of the satellite, a step of determining the activation duration of each beam spot on the basis of the geographical distribution of aircrafts within the service area associated with the position considered.

In some particular embodiments, the sets of combination coefficients are determined so as to form spots of smaller surface area in portions of high aircraft density of the service area considered than in portions of low aircraft density of the service area considered.

In some particular modes of implementation, the sets of combination coefficients are determined so as to control the surface area and/or the shape of each beam spot in order to have a number of aircrafts, within each beam spot, that is below a predetermined threshold value.

In some particular modes of implementation, at least one set of combination coefficients is determined so as to adapt the shape of at least one beam spot to a preferred path for aircrafts within the service area associated with the position considered.

In some particular modes of implementation, the shape of the at least one beam spot is oblong along the preferred path for aircrafts or is oblong transversely to said preferred path for aircraft.

In some particular modes of implementation, at least one set of combination coefficients is configured so as not to form spots within a predetermined exclusion region within the service area associated with the position considered.

According to a fourth aspect, a ground station is proposed comprising means configured for implementing a control method according to any one of the modes of implementation of the invention.

According to a fifth aspect, a system is proposed for the reception of ADS-B messages transmitted by aircraft, said reception system comprising at least one ground station according to any one of the embodiments of the invention and at least one satellite in non-geostationary orbit around the Earth, said at least one satellite carrying onboard a device for the reception of ADS-B messages according to any one of the embodiments of the invention.

BRIEF DESCRIPTION OF DRAWINGS

The invention will be better understood upon reading the following description, given as a non-limiting example, and made with reference to the figures which represent.

In these figures, identical references from one figure to another designate identical or similar elements. For clarity, the items shown are not to scale unless otherwise noted.

DESCRIPTION OF EMBODIMENTS

Figure 1:
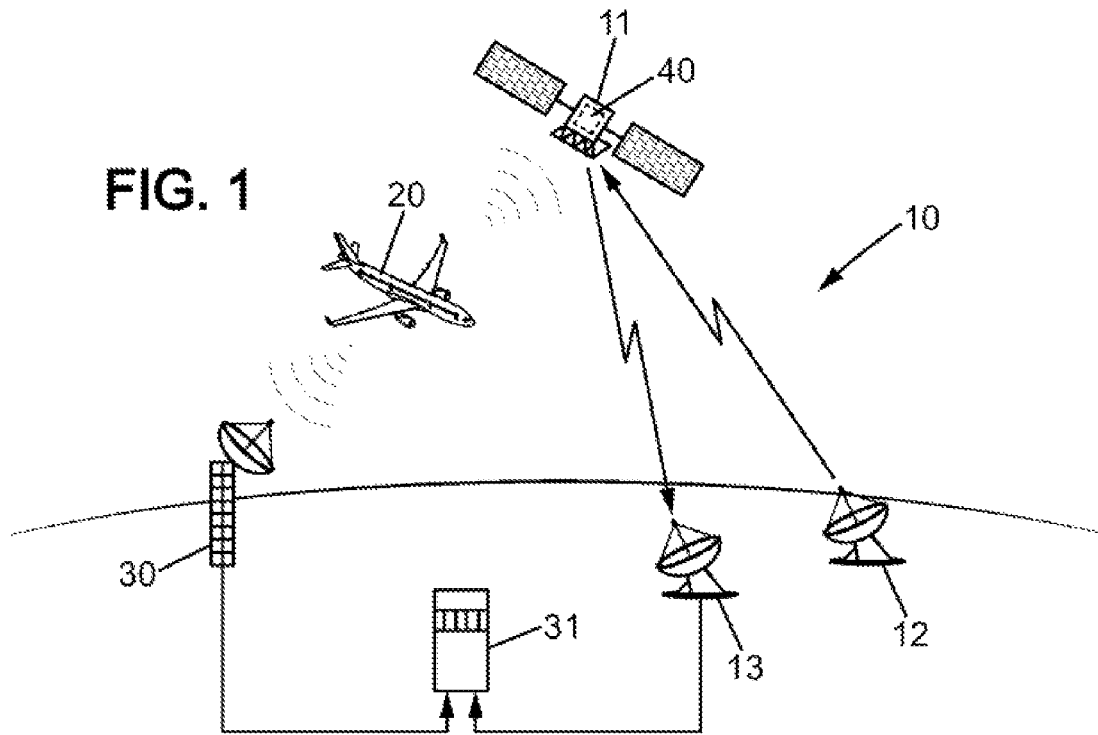
FIG. 1: a schematic representation of one particular embodiment of a system for the reception by satellite of ADS-B messages transmitted by aircraft.

FIG. 1 schematically represents an exemplary embodiment of a system 10 for the reception by satellite of ADS-B messages transmitted by aircrafts such as airplanes 20.

As illustrated in FIG. 1, the reception system 10 comprises one or more satellites 11, each satellite 11 carrying a device 40 for the reception of ADS-B messages which will be described below with reference to FIG. 2.

As indicated above, several physical layer protocols exist for ADS-B messages, and the reception device 40 supports at least one physical layer protocol that is possible for ADS-B messages, for example the 1090 ES protocol. The reception device 40 may also support several physical layer protocols, and may in particular support the 1090 ES, UAT, and VDL Mode 4 protocols all at the same time.

The ADS-B messages transmitted by the airplanes 20 are received by the reception device 40 of the satellite 11. The detected ADS-B messages and/or the information included in the detected ADS-B messages are retransmitted to the ground, to a ground collection station 13. This invention mainly relates to the collection of ADS-B messages by the satellite 11: the processing carried out on the ADS-B messages received by the reception device 40, apart from those detailed below, falls outside the scope of this invention. Thus, for ADS-B messages, the reception device 40 may be either a transparent or a regenerative payload. Similarly, the downlink from the satellite 11 to the ground collection station 13 falls outside the scope of this invention, it being understood that the ADS-B messages detected by the satellite 11 and/or the information extracted from them must be able to be sent down to the ground, directly or indirectly (via another satellite), so that they can be used, for example by the air traffic authorities. Typically, the downlink from the satellite 11 to the ground collection station 13 uses a physical layer protocol that is different from the ADS-B protocol, for example using a frequency band reserved for satellite communications.

The satellite 11 is in non-geostationary orbit, meaning that its projection on the ground moves over the Earth's surface. The non-geostationary orbit of the satellite 11 is for example a Low Earth Orbit (LEO) or a Medium Earth Orbit (MEO). Preferably, the altitude of the non-geostationary orbit is less than or equal to 2000 kilometers (km), or even less than or equal to 1000 km. The non-geostationary orbit is for example an inclined orbit, such as a polar orbit.

As illustrated by FIG. 1, the ADS-B messages transmitted by the airplanes 20 may also be received by ADS-B ground stations 30. Unlike the ground collection stations 13, ADS-B ground stations 30 directly receive the ADS-B messages transmitted by the aircraft, whereas ground collection stations 13 are intended to collect on the ground the ADS-B messages received by the satellite 11. In addition, in the non-limiting example illustrated by FIG. 1, the ADS-B ground stations 30 and the ground collection stations 13 are connected to a same air traffic monitoring center 31, to which they send the information included in the ADS-B messages received. However, in other examples, nothing excludes having a system 10 for the reception by satellite of ADS-B messages that has no ADS-B ground stations 30, in which case the ADS-B messages are collected exclusively by satellites 11.

In the non-limiting example illustrated by FIG. 1, the system 10 for the reception by satellite of ADS-B messages also comprises at least one ground control station 12 for controlling the at least one satellite 11. In some embodiments, the ground control station 12 is used to send, to a satellite 11, configuration information for the reception device 40 of said satellite 11. It should be noted that, in some particular embodiments, the ground control station 12 may be combined with a ground collection station 13, in which case it sends configuration information to the satellite 11 and receives from the satellite 11 the information included in the ADS-B messages received by said satellite 11. The configuration information is sent to the satellite 11 using a physical layer protocol that is different from the ADS-B protocol, for example using a frequency band reserved for satellite communications.

Figure 2:
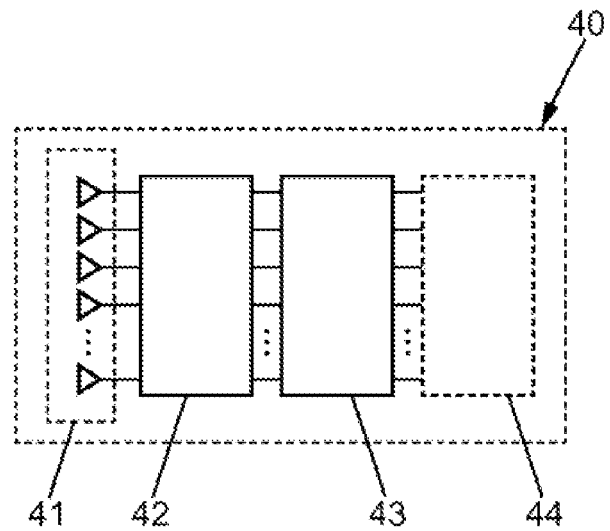
FIG. 2: a schematic representation of one particular embodiment of a device for the reception of ADS-B messages for a satellite.

FIG. 2 schematically represents an exemplary embodiment of a device 40 for the reception of ADS-B messages. As illustrated by FIG. 2, the reception device 40 comprises an array 41 of sources, a beamforming module 42, and a processing circuit 43. It should be noted that the reception device 40 may also include other elements, in particular for radio reception (low noise amplifiers, analog filters, mixers, local oscillators, etc.), which fall outside the scope of this invention and are not represented for reasons of clarity of the figures.

The array 41 of sources of the reception device 40 is suitable for receiving the ADS-B messages emitted by the airplanes 20. Each source of the array 41 of sources may be of any type known to those skilled in the art, and the choice of a particular type of source only constitutes one variant implementation of the reception device 40. For example, it is possible to use sources such as a patch antenna, horn antenna, etc.

The array 41 of sources determines the field of view of the reception device 40, within which the reception device 40 can receive ADS-B messages transmitted by airplanes 20 to the Earth's surface. The ground footprint of the field of view defines a service area of the reception device 40. It should be noted that the field of view of the array 41 of sources can also be limited by the roundness of the Earth, in which case the service area is limited to the part of the Earth which is actually visible from the satellite 11. Due to the non-geostationary nature of the orbit of the satellite 11, the service area is not fixed and moves along with the satellite 11. Thus, different service areas are associated with different respective positions of the satellite 11 in its non-geostationary orbit.

The beamforming module 42 is suitable for forming beams within the field of view of the array 41 of sources. The ground footprint of a formed beam, within the service area, is referred to as a "spot".

In a manner that is known per se, for the formation of a beam, the beamforming module 42 combines signals supplied by some or all of the sources of the array 41 of sources, by means of combination coefficients. Each combination coefficient is a quantity defined by a gain and a phase. By appropriately controlling the combination coefficients, it is possible to control the radiation pattern of the beam. It is thus possible to dynamically control various parameters of the beam, for example such as the main direction of the radiation (and therefore the position of the spot within the service area), the width of the main lobe of the radiation in several dimensions (and therefore the shape and surface area of the spot within the service area), etc. In this invention, the combination coefficients are dynamically modifiable in order to allow adapting the various formed beams to the air traffic conditions anticipated within the service area.

As indicated above, several combination coefficients are required to form a beam. The term "set of combination coefficients" designates the set comprising all the combination coefficients of all the beams to be formed within a single service area. A set of combination coefficients therefore comprises several combination coefficients to be used to form a first beam, several combination coefficients to be used to form a second beam, etc.

The beamforming module 42 may for example be mainly analog, and comprise, in order to apply variable combination coefficients, controllable analog gains and phase shifters. Where necessary, the combination coefficients are modified by appropriately controlling the analog gains and phase shifters.

According to other examples, the beamforming module 42 may be entirely digital, in which case it can be integrated into the processing circuit 43 which is described below. In such case, the beamforming coefficients are applied directly to digital signals obtained after analog-to-digital conversion of the signals supplied by the sources of the array 41 of sources. The use of an entirely digital beamforming module 42 is advantageous in that it allows applying new combination coefficients more quickly, but also in that the combination coefficients can be determined and controlled more precisely, so that it is easier to form beams that are both precise and complex.

The processing circuit 43 comprises for example one or more processors and storage means (magnetic hard disk, electronic memory, optical disk, etc.) in which a computer program product is stored, in the form of a set of program code instructions to be executed in order to control the beamforming module 42. Additionally or alternatively, the processing circuit 43 may comprise one or more programmable logic circuits (FPGA, PLD, etc.), and/or one or more dedicated integrated circuits (ASIC, etc.), and/or a set of discrete electronic components, etc., suitable for carrying out all or part of the control of the beamforming module 42.

In practice, the processing circuit 43 is configured to obtain information representative of the position of the satellite 11 on the non-geostationary orbit. The information representative of the position of the satellite 11 may correspond for example directly to the current position of said satellite 11, for example in the form of GPS coordinates. According to another non-limiting example, the information representative of the position of the satellite 11 may correspond for example to a current date. Indeed, it is possible to predict in advance the date at which the satellite 11 will be at a predetermined position, such that any date is associated with a position of the satellite 11 in its non-geostationary orbit. Obtaining information representative of the position is carried out in a conventional manner, and the choice of a particular method for obtaining such information representative of the position of the satellite 11 in its non-geostationary orbit only constitutes one variant implementation of the reception device 40.

The position of the satellite 11 in its non-geostationary orbit determines the associated service area within which the beamforming module 42 is to form the beam spots.

For each service area, it is possible to establish beforehand, i.e. before the satellite 11 flies over said service area with a view to forming beam spots therein, an airplane density map representative of a theoretical geographical distribution of the airplanes within each service area. Indeed, air traffic is controlled according to certain well-established rules. For example, there are air corridors which represent preferred paths followed by airplanes, at least locally. Furthermore, airports are points of convergence for airplanes, which dictate the paths of the airplanes, etc. As a result, air traffic is not random and the density of aircrafts is not the same at any point on the Earth's surface, and varies during the day. It is thus possible to carry out a statistical analysis of air traffic beforehand, in order to estimate beforehand the airplane density map at the scale of the entire Earth or part of the Earth, representative of the geographical distribution of airplanes. The airplane density map may include, for example, an average airplane density, a maximum airplane density, etc., for each portion of each service area. The airplane density map therefore makes it possible to know in particular which portions of a given service area are densely populated with airplanes, and which other portions of said service area are sparsely populated. Such an airplane density map may be updated on a recurring basis, to take into account changes in air traffic. Such an update may take into account air traffic observations made on the basis of ADS-B messages received by the satellite 11, during previous overflights of each service area.

It should be noted here that the airplane density map does not concern all airplanes, but only the airplanes that are broadcasting ADS-B messages. Indeed, not all airplanes or aircrafts are equipped with ADS-B transponders, and only those sending ADS-B messages are of interest for the reception device 40. However, it is possible in certain modes of implementation to also take into account the aircrafts which are sending signals in the same frequency bands as those of the ADS-B messages considered. For example, Mode S radar transponders use the same frequency as the ADS-B messages of the 1090 ES protocol. Establishing the aircraft density map can therefore also take into account aircrafts which, although not transmitting ADS-B 1090 ES messages, are equipped with Mode S radar transponders.

Since the (theoretical) geographical distribution of airplanes within each service area is known beforehand, it is possible to adapt the formed beams to the air traffic conditions anticipated within the service area associated with the current position of the satellite 11.

To this end, the processing circuit 43 is configured to modify a set of combination coefficients of the beamforming module 42 so as to adapt the surface area and/or the shape of the spots of the formed beams to the geographical distribution of airplanes within the service area associated with the position of the satellite 11 in its non-geostationary orbit, on the basis of information representative of said position of said satellite 11 in its non-geostationary orbit.

Preferably, the processing circuit 43 stores a mission plan comprising a plurality of sets of combination coefficients, each set of combination coefficients being associated with a respective position of the satellite 11 on the non-geostationary orbit and making it possible to form beam spots for which the surface area and/or the shape is adapted to the geographical distribution of aircrafts within the service area associated with said respective position of the satellite 11 in said non-geostationary orbit. The mission plan therefore groups together the sets of combination coefficients which will be successively applied by the satellite 11, from one service area to another, as the satellite 11 moves from one position to another in its non-geostationary orbit.

The mission plan may be determined by the processing circuit 43 on the basis of airplane density maps associated with the various service areas, the airplane density maps being storable in the form of a single comprehensive airplane density map representative of the geographical distribution of airplanes within all the service areas. The airplane density maps may be received, for example, from the ground control station 12.

In preferred embodiments, the mission plan is calculated on the ground, for example by the ground control station 12. Where appropriate, the reception device 40 comprises, as illustrated by FIG. 2, a reception module 44 for receiving the mission plan, transmitted by the ground control station 12 as configuration information. The mission plan stored by the device 40 for the reception of ADS-B messages may be updated on a recurring basis by the ground control station 12 so as to take changes in air traffic into account.

Thus, based on information representative of the position of the satellite, the processing circuit 43 finds in the stored mission plan the set of combination coefficients associated with the corresponding position of the satellite 11, to be used for the service area overflown by the satellite 11, and uses this set of combination coefficients to control the beamforming module 42.

The set of combination coefficients is applied during an observation period of predetermined duration, which may vary from one service area to another. The set of combination coefficients comprises the combination coefficients of each beam to be formed. Each beam is formed during an activation duration which is less than or equal to the duration of the observation period, and which can vary from one beam to another. The beams may be formed simultaneously and/or successively according to a beam activation sequence associated with the set of combination coefficients, which may also be included in the mission plan. The signal supplied by a beam, which includes the ADS-B messages received from airplanes located within the associated spot, is processed by a processing module (not shown in the figures), which may be integrated into the processing circuit 43. The reception device 40 preferably comprises several processing modules, and each processing module is for example configured to detect the ADS-B messages present in the beam signal, and possibly to extract the information included in the detected ADS-B messages. The number of processing modules must allow processing the signals of all beams formed during the observation period, and is for example greater than or equal to the maximum number of beams to be formed simultaneously for each service area. The ADS-B messages detected and/or the information extracted are then transmitted to a ground collection station 13, by means of a transmission module (not shown in the figures) of the reception device 40.

The remainder of the description concerns, in a non-limiting manner, the case where the mission plan is calculated by the ground control station 12, and is received by the reception device 40 which applies it in order to control the beamforming module 42 for the reception of ADS-B messages. The mission plan comprises the sets of combination coefficients, and possibly the associated activation sequences, associated with a plurality of positions that the satellite 11 will occupy over a predetermined time horizon.

Figure 3:
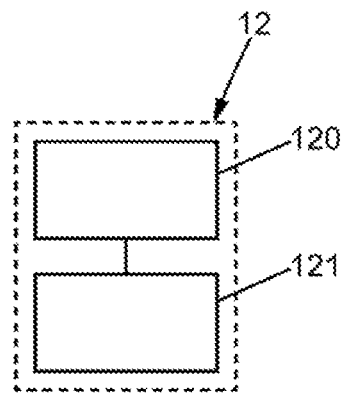
FIG. 3: a schematic representation of one particular embodiment of a ground station for controlling a satellite carrying a device for the reception of ADS-B messages.

FIG. 3 schematically represents one embodiment of a ground control station 12. In this example, the ground control station 12 comprises a transmission module 120 and a processing circuit 121.

The transmission module 120 is used to transmit configuration information intended for the reception module 44 of the satellite 11, where said configuration information can be used by the processing circuit 43. The configuration information may include the mission plan to be used, or an update to a mission plan stored by the reception device 40. The transmission module 120 corresponds to an electromagnetic circuit comprising devices considered to be known to those skilled in the art.

The processing circuit 121 comprises for example one or more processors, and storage means (magnetic hard drive, electronic memory, optical disk, etc.) in which a computer program product is stored, in the form of a set of program code instructions to be executed in order to implement, with the transmission module 120, the various steps of a control method 50 described below. Additionally or alternatively, the processing circuit 121 may comprise one or more programmable logic circuits (FPGA, PLD, etc.), and/or one or more dedicated integrated circuits (ASIC, etc.), and/or a set of discrete electronic components, etc., suitable for implementing with the transmission module 120 some or all of the steps of the control method 50.

In other words, the processing circuit 121 and the transmission module 120 correspond to means configured in software (specific computer program product) and/or hardware (FPGA, PLD, ASIC, discrete electronic components, radio circuit, etc.) to carry out some or all of the steps of the control method 50 described below.

Figure 4:
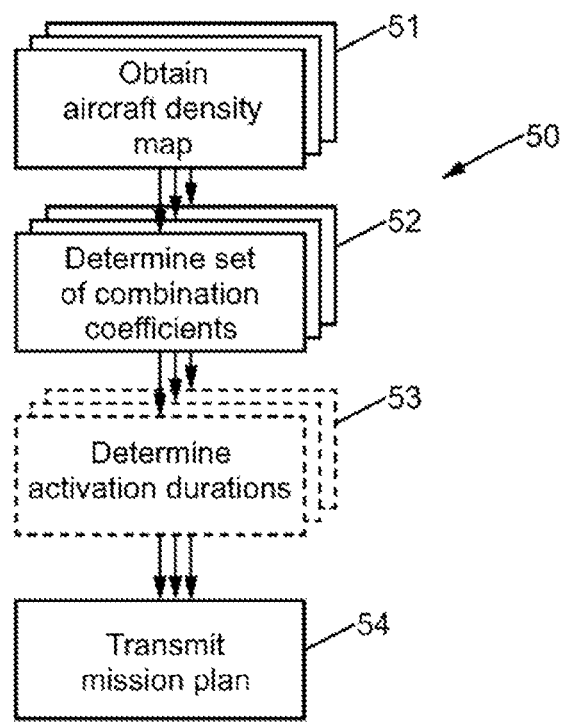
FIG. 4: a flowchart illustrating the main steps of one particular mode of implementation of a method for controlling a satellite carrying a device for the reception of ADS-B messages.

FIG. 4 represents the main steps of an exemplary implementation of a control method 50 for controlling the reception device 40, its steps implemented by the ground control station 12.

As illustrated by FIG. 4, the control method 50 comprises, for each position among a plurality of predetermined positions of the satellite 11 in its non-geostationary orbit, the steps of:

51 obtaining an airplane density map representative of the geographical distribution of airplanes within the service area associated with the considered position of the satellite 11 on the non-geostationary orbit,

52 determining a set of combination coefficients on the basis of the airplane density map.

The airplane density map obtained for a given service area corresponds for example to a portion of a comprehensive airplane density map stored by the processing circuit 121. As indicated above, the beams are formed during an observation period of predetermined duration. Consequently, the ground footprint of the field of view of the array 41 of sources will move during the observation period, due to the advancement of the satellite 11 in its non-geostationary orbit. For example, it is possible to consider that the movement of the service area is negligible for the duration of the observation period, or it is possible to consider a reference service area for the entire observation period, which corresponds for example to the service area associated with the initial position of the satellite 11 at the start of the observation period, or with the anticipated position of the satellite 11 in the middle of the observation period, etc.

Next, during step 52, the set of combination coefficients is determined for adapting the surface area and/or the shape of the spots of the formed beams to the geographical distribution of airplanes within the service area associated with the position considered. Thus, the step 52 of determining a set of combination coefficients for a given position comprises defining, within the service area associated with the position considered, beam spots whose surface areas and/or shapes are adapted to the geographical distribution of airplanes within said service area. Once the surface areas and/or the shapes of said spots have been defined, as well as the positions of said spots within said service area, the set of combination coefficients which allows forming these spots can be calculated according to any method known to those skilled in the art, the choice of a particular calculation method only constituting one variant implementation of the invention.

As indicated above, adaptation of the beam spots to the anticipated air traffic conditions concerns, for example, forming spots of smaller surface area in portions with a high density of airplanes than in portions with a low density of airplanes. Additionally or alternatively, adaptation of the beam spots concerns, for example, controlling the surface area and/or the shape of each beam spot so as to have within said beam spot a number of airplanes that is below a predetermined threshold value. Additionally or alternatively, adaptation of the beam spots concerns, for example, adapting the shape of at least one beam spot to a preferred path for airplanes within the service area associated with the position considered.

In preferred modes of implementation, and as illustrated by FIG. 4, the control method 50 may comprise, for each position considered, a step 53 of determining the activation duration of each beam spot on the basis of the geographical distribution of airplanes within the service area considered. The activation durations of the beam spots may be determined jointly with the determination of the surface areas and/or shapes of said beam spots. For example, it is possible to provide longer activation durations for beam spots likely to contain a large number of airplanes than for beam spots likely to contain a lower number of planes. However, in other examples, nothing excludes considering a same activation duration for all beam spots, which is less than or equal to the duration of the observation period for the service area considered.

The determination of the sets of combination coefficients for forming the beams and, where appropriate, of the activation durations of said beams, is for example carried out by simulation, according to an iterative process which takes into account the geographical distribution of airplanes within the service area considered, a maximum number of airplanes within each beam, the duration of the observation period, a maximum number of beams that can be formed, etc. Such an iterative process aims for example to maximize the number of ADS-B messages that can be detected during the observation period, or to maximize the probability of detecting at least one ADS-B message per airplane located within the service area considered, etc.

Preferably, the beam spots to be formed are determined so as to have a spot formed in all portions of the service area considered during at least some of the observation period. Preferably, the beam spots to be formed may also be determined so that there is a partial overlap between adjacent spots, for example in order to avoid missing the ADS-B messages transmitted by airplanes located at the boundaries of adjacent spots.

It should be noted that it is also possible not to seek to cover the entire service area with beam spots. In particular, it is possible, in some particular modes of implementation, to provide an exclusion region within a service area. Thus, the set of combination coefficients is configured so as not to form spots within this predetermined exclusion region with the service area associated with the position considered.

Such an exclusion region is predetermined, and corresponds for example to a geographical region in which there are other means for the reception of ADS-B messages transmitted by airplanes, for example due to the presence of ADS-B ground stations 30 within this geographical region. Such an exclusion region may also correspond to a geographical region which cannot be correctly observed from a satellite 11, for example if the airplane density within this geographical region is too great (airports, etc.). This ability to exclude certain geographical regions during beamforming, in particular geographical regions that are well covered by other means, also reduces the total number of beams to be formed.

As illustrated by FIG. 4, the control method 50 further comprises a step 54 of transmitting, to the reception device 40 onboard the satellite 11, the mission plan which groups together the sets of combination coefficients respectively associated with the plurality of considered positions of the satellite 11 in its non-geostationary orbit.

Figure 5:
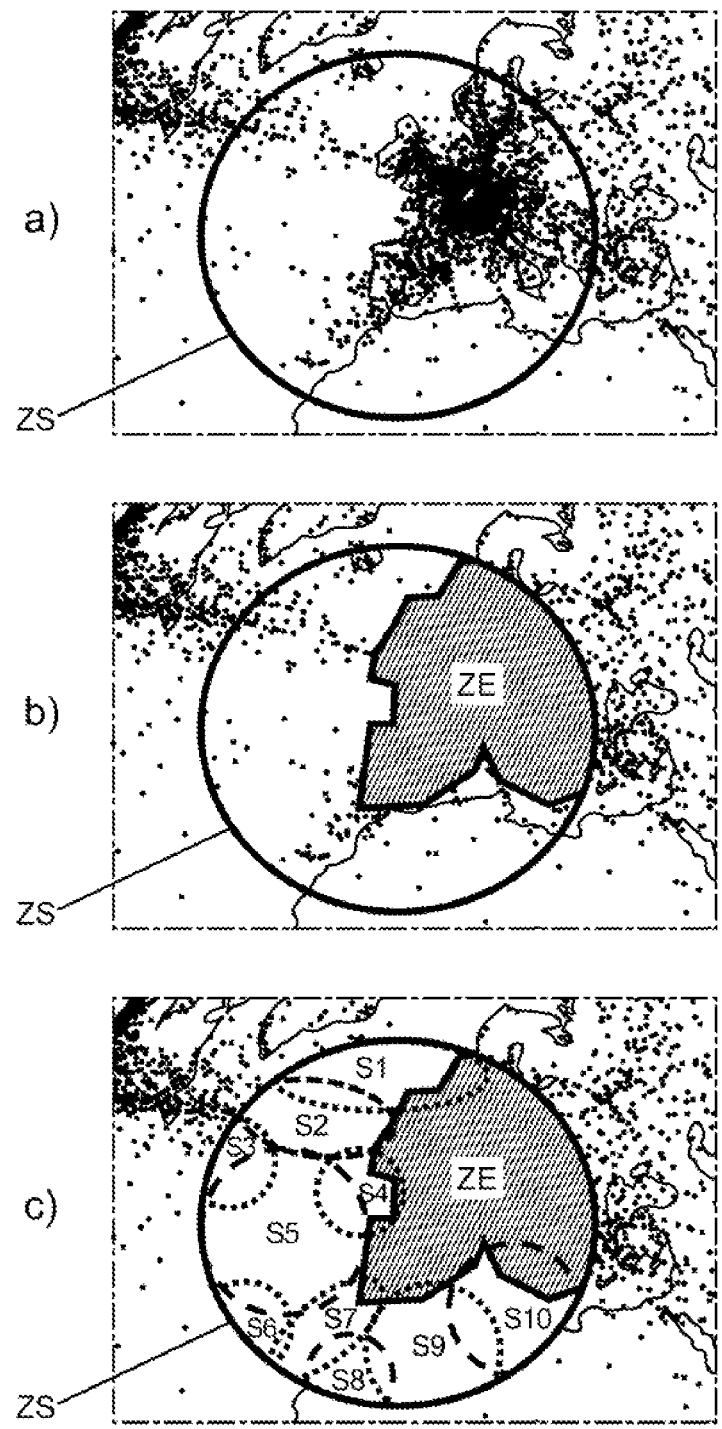
FIG. 5: an example illustrating the formation of beams for the collection of ADS-B messages within a service area of a satellite carrying a device for the reception of ADS-B messages.

FIG. 5 schematically represents an exemplary implementation of the control method 50.

More specifically, part a) of FIG. 5 schematically represents an example of an airplane density map representing the geographical distribution of airplanes in Europe and North Africa. The service area ZS is indicated by a solid line. Airplanes are represented by black dots in this airplane density map, and we can see in particular that the density of airplanes in the Europe area is very high. One will also note the presence of air corridors, particularly in the northwestern part of Europe heading towards North America or in the southwestern part of Europe heading towards South America.

As illustrated by part b) of FIG. 5, it has been decided that Europe should not be covered (due for example to the high density anticipated therein and/or due to satisfactory coverage by ADS-B 30 ground stations), and an exclusion region ZE is planned for Europe. Therefore, it is not necessary to form spots within this exclusion region ZE.

Part c) of FIG. 5 schematically represents examples of beam spots that can be formed in the service area ZS, excluding the exclusion region ZE, by adapting the surface area and/or the shape of the beam spots to the geographical distribution of the airplanes. In this example, 10 (ten) beam spots are formed, respectively denoted S1 to S10 and represented by dotted lines. For clarity in part c) of FIG. 5, the airplanes present within the service area ZS, visible in part a), are not represented in part c) of FIG. 5.

As illustrated in part c) of FIG. 5, the spots S1-S10 are of various shapes and surface areas.

For example, spot S5 is substantially circular and has the largest surface area, and covers a portion with a low density of airplanes 20. Spots S3, S4, S6, S8, S9, and S10 are also substantially circular in shape, with respective surface areas that are smaller than that of spot S5.

Spots S2 and S7 are positioned in air corridors, and said air corridors define preferred paths for airplanes 20. In the example shown, spots S2 and S7 are oblong in shape along the preferred path for airplanes 20. In the example illustrated by part c) of FIG. 5, each preferred path is served by a single spot of oblong shape along the preferred path considered. It is also possible, in particular if the preferred path extends over a large portion of the service area ZS, to provide at least two spots of oblong shape, arranged within the extension of one another along said preferred path. However, in other examples, nothing excludes covering the preferred paths for the airplanes 20 in a different manner. For example, it is possible to form beam spots of oblong shape but arranged transversely to said preferred path for the airplanes 20. It is also possible, according to other examples, to form spots of substantially circular shape, arranged all along the preferred path. Such circular spots are for example of small surface area, given the fact that the density of airplanes within an air corridor is generally high.

Spot S1 is also oblong in shape, arranged to cover most of the northern portion of the service area ZS. In this northern portion of the service area ZS, the density of airplanes is low, so the surface area of spot S1 is larger than that of spots S2 and S7 in particular.

As indicated above, it is possible, in certain modes of implementation, to adapt the activation durations of the beam spots to the distribution of airplanes 20 within the service area ZS considered.

In the example illustrated by part c) of FIG. 5, it is possible to have an activation duration that is 100% of the duration of the observation period for spots S2 and S7 only, which have the highest airplane density. In the case of 1090 ES type ADS-B messages, the duration of the observation period is greater than 1.2 seconds (s), and is for example between 5 s and 10 s. For the other spots, it is possible to provide shorter activation durations. For example, it is possible to provide activation durations equal to 50% of the duration of the observation period for spots S1, S4, S5, and S10, and equal to 25% of the duration of the observation period for spots S3, S6, S8, and S9. Due to these different activation durations, it is possible to activate certain beam spots successively during the observation period, so that only 5 (five) processing modules are needed to process the signals of the 10 (ten) beams formed, for example by applying the following activation sequence:

- a first processing module and a second processing module process the signals of the beams of spots S2 and S7 in parallel, for the entire duration of the observation period
- a third processing module successively processes the signals of the beams of spots S1 and S4, which are formed successively over the course of the observation period,
- a fourth processing module successively processes the signals of the beams of spots S5 and S10, which are formed successively over the course of the observation period,
- a fifth processing module successively processes the signals of the beams of spots S3, S6, S8, and S9, which are formed successively over the course of the observation period.

Figure 6:
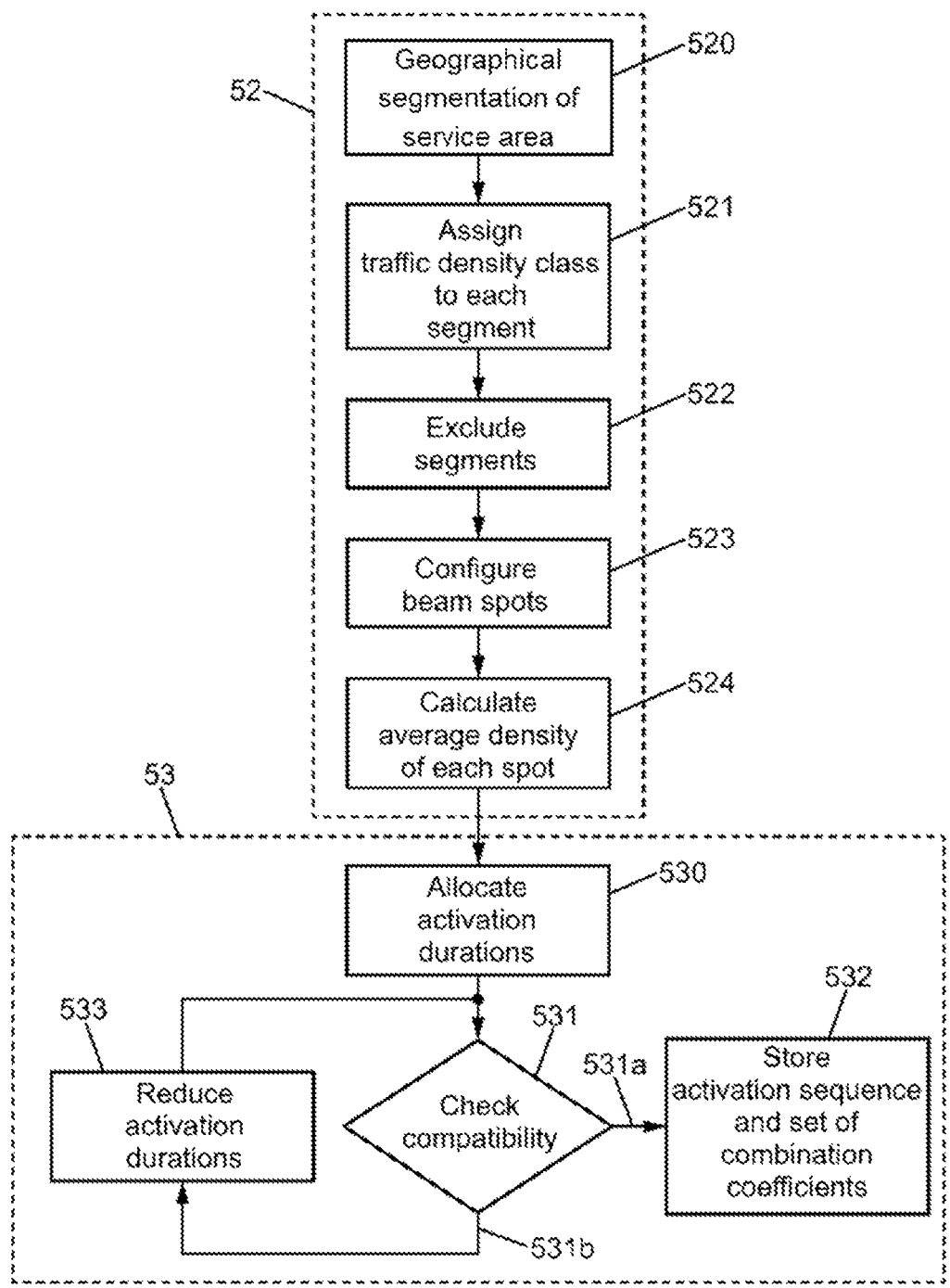
FIG. 6: a flowchart illustrating the main steps of one particular mode of implementation of the determination of a set of combination coefficients and of beam activation durations.

FIG. 6 schematically represents the main steps of one particular mode of implementation of the step 52 of determining a set of combination coefficients for the formation of beams for a considered position of the satellite 11 in its non-geostationary orbit, and the step 53 of determining the activation durations of said beams. The steps illustrated in FIG. 6 are repeated for each considered position of the satellite 11 within its non-geostationary orbit.

As illustrated by FIG. 6, step 52 firstly comprises a step 520 of geographic segmentation of the service area associated with the considered position of the satellite 11. Step 520 of geographic segmentation consists for example of dividing the service area into a regular grid so as to obtain a plurality of segments all having substantially the same shape and substantially the same surface area. The surface area of each segment is for example less than or equal to the minimum surface area that a spot formed by the satellite 11 can have.

Step 52 then includes, for example, a step 521 of assigning a traffic density class to each component segment of the service area. Thus, several traffic density classes are defined beforehand (for example: low, medium, and high density, etc.), and each segment is linked to a traffic density class according to the number of airplanes anticipated within the segment considered, based on the aircraft density map.

Step 52 then includes, for example, a step 522 of excluding segments in which the number of anticipated airplanes is greater than a predetermined maximum number. The segments thus excluded correspond to an exclusion region in which no beam spot will be formed.

Step 52 then includes, for example, a step 523 of configuring beam spots by grouping adjacent segments belonging to a same traffic density class or to similar traffic density classes. Each grouping of adjacent segments defines a spot to be formed, and the grouping is preferably carried out under the constraint of a predetermined maximum spot size for the traffic density class considered. Indeed, the number of adjacent segments that can be grouped together is advantageously limited in order to avoid having too many airplanes likely to be present within the spot thus defined. The maximum number of adjacent segments that can be grouped for a class of high traffic density is smaller than the maximum number of adjacent segments that can be grouped for a class of low traffic density, and such segment grouping ensures that the number of airplanes within each spot remains below a predetermined threshold value. Configuration of the spots is for example carried out iteratively in order to optimize the segment groupings, i.e. in order to identify segment groupings which allow minimizing the number of beams to be formed for the service area considered. The set of combination coefficients which allows forming the beam spots thus defined are for example calculated during step 523.

Step 52 then includes, for example, a step 524 of calculating an average density of airplanes within each spot defined during the step 523 of configuring spots. As above for segments, each spot is for example linked to a traffic density class, based on the average density calculated for the spot considered.

Step 53 includes for example a step 530 of allocating respective activation durations for the spots defined during the step 523 of configuring spots, according to the traffic density classes assigned to said spots. The activation durations are less than or equal to the duration of the observation period. For example, it is possible to provide reference activation durations respectively associated with the different traffic density classes. Thus, the activation duration of a spot is for example chosen to be equal to the reference activation duration associated with the traffic density class assigned to that spot. For example, the reference activation duration for a class of high traffic density may be equal to 100% of the duration of the observation period. The reference activation duration for a class of average traffic density may be equal to 50% of the duration of the observation period. The reference activation duration for a class of low traffic density may be equal to 25% of the duration of the observation period, etc.

Once the respective activation durations of the various spots have been allocated during step 530, step 52 includes for example a step 531 of verifying compatibility with the processing capacities of the reception device 40. Indeed, the defined spots and their activation durations should preferably be able to be processed by the various processing modules within the duration of the observation period. In other words, step 531 checks whether a sequence exists for the successive and/or simultaneous activation of the various beam spots, checking the allocated activation durations which allow processing the signals of the defined beam spots within the duration of the observation period. In the case where such an activation sequence exists (reference 531a in FIG. 6), then step 52 includes a step 532 of storing the activation sequence and the set of combination coefficients which allow forming the beam spots defined during step 523. In the event that the defined spots and their respective activation durations are not compatible with the processing capacities of the reception device 40 (reference 531b in FIG. 6), then step 52 includes for example a step 533 of reducing all or part of the respective activation durations of the various spots, until an activation sequence is obtained which is compatible with the processing capacities of the reception device 40. The reductions applied are, for example, proportional to the activation durations, and the proportional coefficients applied depend, for example, on the traffic density class assigned to each spot. For example, the reduction applied (for example 5% reduction) to the activation duration of a spot associated with a class of low traffic density can be proportionally higher than the reduction applied (for example 2% reduction) to a spot associated with a class of high traffic density.

As indicated above, the steps illustrated in FIG. 6 are repeated for each considered position of the satellite 11 in its non-geostationary orbit. The sets of combination coefficients calculated in this manner (and, if necessary, the associated activation sequences) are then incorporated into the mission plan which is sent to the satellite 11. The mission plan is further configured to allow the reception device 40 to apply each set of combination coefficients (and, where appropriate, the associated activation sequence) when the satellite 11 is at the correct position in its non-geostationary orbit. For example, each set of combination coefficients is associated, in the mission plan, with information representative of the associated position of the satellite 11 in its non-geostationary orbit. Thus, when the processing circuit 43 obtains information representative of the current position of the satellite 11 in its non-geostationary orbit, it can extract from the stored mission plan the set of combination coefficients associated with this position, and use this to form spots adapted to the distribution of airplanes within the service area associated with this position.

More generally, it should be noted that the modes of implementation and the embodiments considered above have been described as non-limiting examples, and that other variants are therefore possible.

The invention claimed is:

1. A device for the reception of ADS-B messages for a satellite in non-geostationary orbit around the Earth, said reception device comprising an array of sources and a beamforming module capable of forming beams within a field of view of said array of sources, a ground footprint of said field of view defining a service area of said reception device, different service areas being associated with different respective positions of the satellite on the non-geostationary orbit, a ground footprint of a beam defining a spot within the service area, said beamforming module being configured to form each beam by combining signals provided by the array of sources by applying combination coefficients, wherein said reception device comprises a processing circuit configured to obtain information representative of a position of the satellite in non-geostationary orbit and to modify a set of combination coefficients of the beamforming module so as to adapt a surface area and/or a shape of the spots of the formed beams to a geographical distribution of the aircrafts within the service area associated with the position of said satellite on the non-geostationary orbit, and wherein the processing circuit is further configured to control respective activation durations of the spots of the beams formed within the service area associated with the position of the satellite, according to the geographical distribution of aircrafts within said service area.

2. The reception device according to claim 1, wherein the set of combination coefficients is determined so as to form spots of smaller surface area in portions of high aircraft density of the service area than in portions of low aircraft density of the service area.

3. The reception device according to claim 1, wherein the set of combination coefficients is modified so as to control the surface area and/or the shape of each beam spot formed within the service area associated with the position of the satellite, in order to have a number of aircrafts, within each beam spot, that is lower than a predetermined threshold value.

4. The reception device according to claim 1, wherein the set of coefficients is modified so as to adapt the shape of at least one formed beam spot to a preferred path for aircrafts within the service area associated with the position of the satellite.

5. The reception device of claim 1, wherein the set of combination coefficients is configured so as not to form spots within a predetermined exclusion region for the service area associated with the position of the satellite.

6. A device for the reception of ADS-B messages for a satellite in non-geostationary orbit around the Earth, said reception device comprising an array of sources and a beamforming module capable of forming beams within a field of view of said array of sources, a ground footprint of said field of view defining a service area of said reception device, different service areas being associated with different respective positions of the satellite on the non-geostationary orbit, a ground footprint of a beam defining a spot within the service area, said beamforming module being configured to form each beam by combining signals provided by the array of sources by applying combination coefficients, wherein said reception device comprises a processing circuit configured to obtain information representative of a position of the satellite in non-geostationary orbit and to modify a set of combination coefficients of the beamforming module so as to adapt a surface area and/or a shape of the spots of the formed beams to a geographical distribution of the aircrafts within the service area associated with the position of said satellite on the non-geostationary orbit, and wherein the set of coefficients is modified so as to adapt the shape of at least one formed beam spot to a preferred path for aircrafts within the service area associated with the position of the satellite.

7. The reception device according to claim 6, wherein the shape of the at least one beam spot is oblong along the preferred path for aircrafts or oblong transversely to said preferred path for aircrafts.

8. The reception device according to claim 6, wherein the set of combination coefficients is determined so as to form spots of smaller surface area in portions of high aircraft density of the service area than in portions of low aircraft density of the service area.

9. The reception device according to claim 6, wherein the set of combination coefficients is modified so as to control the surface area and/or the shape of each beam spot formed within the service area associated with the position of the satellite, in order to have a number of aircrafts, within each beam spot, that is lower than a predetermined threshold value.

10. The reception device of claim 6, wherein the set of combination coefficients is configured so as not to form spots within a predetermined exclusion region for the service area associated with the position of the satellite.

11. A device for the reception of ADS-B messages for a satellite in non-geostationary orbit around the Earth, said reception device comprising an array of sources and a beamforming module capable of forming beams within a field of view of said array of sources, a ground footprint of said field of view defining a service area of said reception device, different service areas being associated with different respective positions of the satellite on the non-geostationary orbit, a ground footprint of a beam defining a spot within the service area, said beamforming module being configured to form each beam by combining signals provided by the array of sources by applying combination coefficients,
wherein said reception device comprises a processing circuit configured to obtain information representative of a position of the satellite in non-geostationary orbit and to modify a set of combination coefficients of the beamforming module so as to adapt a surface area and/or a shape of the spots of the formed beams to a geographical distribution of the aircrafts within the service area associated with the position of said satellite on the non-geostationary orbit, and
wherein the set of combination coefficients is configured so as not to form spots within a predetermined exclusion region for the service area associated with the position of the satellite.

12. The reception device according to claim 11, wherein the set of combination coefficients is determined so as to form spots of smaller surface area in portions of high aircraft density of the service area than in portions of low aircraft density of the service area.

13. The reception device according to claim 11, wherein the set of combination coefficients is modified so as to control the surface area and/or the shape of each beam spot formed within the service area associated with the position of the satellite, in order to have a number of aircrafts, within each beam spot, that is lower than a predetermined threshold value.

14. A method for controlling, via a ground station, a device for the reception of ADS-B messages which is carried onboard a satellite in non-geostationary orbit around the Earth, said reception device comprising an array of sources and a beamforming module capable of forming beams within a field of view of said array of sources, a ground footprint of said field of view defining a service area of said reception device, different service areas being associated with different respective positions of the satellite on the non-geostationary orbit, a ground footprint of a beam defining a spot within the service area, said beamforming module being configured to form each beam by combining signals supplied by the array of sources by applying combination coefficients,
wherein said control method comprises, for each among a plurality of predetermined positions of the satellite in said non-geostationary orbit, the steps of:
obtaining an aircraft density map representative of the geographical distribution of aircrafts within the service area associated with the considered position of the satellite on the non-geostationary orbit,
determining a set of combination coefficients on the basis of the aircraft density map, the set of combination coefficients being determined so as to adapt a surface area and/or a shape of the formed beam spots to the geographical distribution of aircrafts within the service area associated with the position considered,
for each position among the plurality of positions of the satellite, determining the activation duration of each beam spot on the basis of the geographical distribution of aircrafts within the service area associated with the position considered, and
wherein said control method further comprises a step of transmitting, to the reception device onboard the satellite, a mission plan which groups together the sets of combination coefficients respectively associated with the plurality of positions of the satellite on the non-geostationary orbit.

15. The control method according to claim 14, wherein each set of combination coefficients makes it possible to form a plurality of beams simultaneously and/or successively during an observation period of predetermined duration for observing the service area associated with the position associated with said set of combination coefficients.

16. The control method according to claim 14, wherein the sets of combination coefficients are determined so as to form spots of smaller surface area in portions of high aircraft density of the service area considered than in portions of low aircraft density of the service area considered.

17. The control method according to claim 14, wherein the sets of combination coefficients are determined so as to control the surface area and/or the shape of each beam spot in order to have a number of aircrafts, within each beam spot, that is below a predetermined threshold value.

18. The control method according to claim 14, wherein at least one set of combination coefficients is determined so as to adapt the shape of at least one beam spot to a preferred path for aircrafts within the service area associated with the position considered.

19. The control method according to claim 14, wherein at least one set of combination coefficients is configured so as not to form spots within a predetermined exclusion region within the service area associated with the position considered.

20. A method for controlling, via a ground station, a device for the reception of ADS-B messages which is carried onboard a satellite in non-geostationary orbit around the Earth, said reception device comprising an array of sources and a beamforming module capable of forming beams within a field of view of said array of sources, a ground footprint of said field of view defining a service area of said reception device, different service areas being associated with different respective positions of the satellite on the non-geostationary orbit, a ground footprint of a beam defining a spot within the service area, said beamforming module being configured to form each beam by combining signals supplied by the array of sources by applying combination coefficients,
wherein said control method comprises, for each among a plurality of predetermined positions of the satellite in said non-geostationary orbit, the steps of:
obtaining an aircraft density map representative of the geographical distribution of aircrafts within the service area associated with the considered position of the satellite on the non-geostationary orbit,
determining a set of combination coefficients on the basis of the aircraft density map, the set of combination coefficients being determined so as to adapt a surface area and/or a shape of the formed beam spots to the geographical distribution of aircrafts within the service area associated with the position considered, wherein said control method further comprises a step of transmitting, to the reception device onboard the satellite, a mission plan which groups together the sets of combination coefficients respectively associated with the plurality of positions of the satellite on the non-geostationary orbit, wherein at least one set of combination coefficients is determined so as to adapt the shape of at least one beam spot to a preferred path for aircrafts within the service area associated with the position considered.

21. The control method according to claim 20, wherein the shape of the at least one beam spot is oblong along the preferred path for aircrafts or is oblong transversely to said preferred path for aircraft.

22. The control method according to claim 20, wherein each set of combination coefficients makes it possible to form a plurality of beams simultaneously and/or successively during an observation period of predetermined duration for observing the service area associated with the position associated with said set of combination coefficients.

23. The control method according to claim 20, wherein the sets of combination coefficients are determined so as to form spots of smaller surface area in portions of high aircraft density of the service area considered than in portions of low aircraft density of the service area considered.

24. The control method according to claim 20, wherein the sets of combination coefficients are determined so as to control the surface area and/or the shape of each beam spot in order to have a number of aircrafts, within each beam spot, that is below a predetermined threshold value.

25. The control method according to claim 20, wherein at least one set of combination coefficients is configured so as not to form spots within a predetermined exclusion region within the service area associated with the position considered.

26. A method for controlling, via a ground station, a device for the reception of ADS-B messages which is carried onboard a satellite in non-geostationary orbit around the Earth, said reception device comprising an array of sources and a beamforming module capable of forming beams within a field of view of said array of sources, a ground footprint of said field of view defining a service area of said reception device, different service areas being associated with different respective positions of the satellite on the non-geostationary orbit, a ground footprint of a beam defining a spot within the service area, said beamforming module being configured to form each beam by combining signals supplied by the array of sources by applying combination coefficients, wherein said control method comprises, for each among a plurality of predetermined positions of the satellite in said non-geostationary orbit, the steps of:

obtaining an aircraft density map representative of the geographical distribution of aircrafts within the service area associated with the considered position of the satellite on the non-geostationary orbit, determining a set of combination coefficients on the basis of the aircraft density map, the set of combination coefficients being determined so as to adapt a surface area and/or a shape of the formed beam spots to the geographical distribution of aircrafts within the service area associated with the position considered, wherein said control method further comprises a step of transmitting, to the reception device onboard the satellite, a mission plan which groups together the sets of combination coefficients respectively associated with the plurality of positions of the satellite on the non-geostationary orbit, wherein at least one set of combination coefficients is configured so as not to form spots within a predetermined exclusion region within the service area associated with the position considered.

27. The control method according to claim 26, wherein each set of combination coefficients makes it possible to form a plurality of beams simultaneously and/or successively during an observation period of predetermined duration for observing the service area associated with the position associated with said set of combination coefficients.

28. The control method according to claim 26, wherein the sets of combination coefficients are determined so as to form spots of smaller surface area in portions of high aircraft density of the service area considered than in portions of low aircraft density of the service area considered.

29. The control method according to claim 26, wherein the sets of combination coefficients are determined so as to control the surface area and/or the shape of each beam spot in order to have a number of aircrafts, within each beam spot, that is below a predetermined threshold value.

\* \* \* \* \*